Dec. 31, 1929.  W. J. SHEIRS  1,741,441
CUSHION FRAME FOR TIRES
Filed Oct. 5, 1928  2 Sheets-Sheet 1

Inventor,
William J. Sheirs.
By A. R. Appleman
Attorney.

Dec. 31, 1929.  W. J. SHEIRS  1,741,441
CUSHION FRAME FOR TIRES
Filed Oct. 5, 1928   2 Sheets-Sheet 2
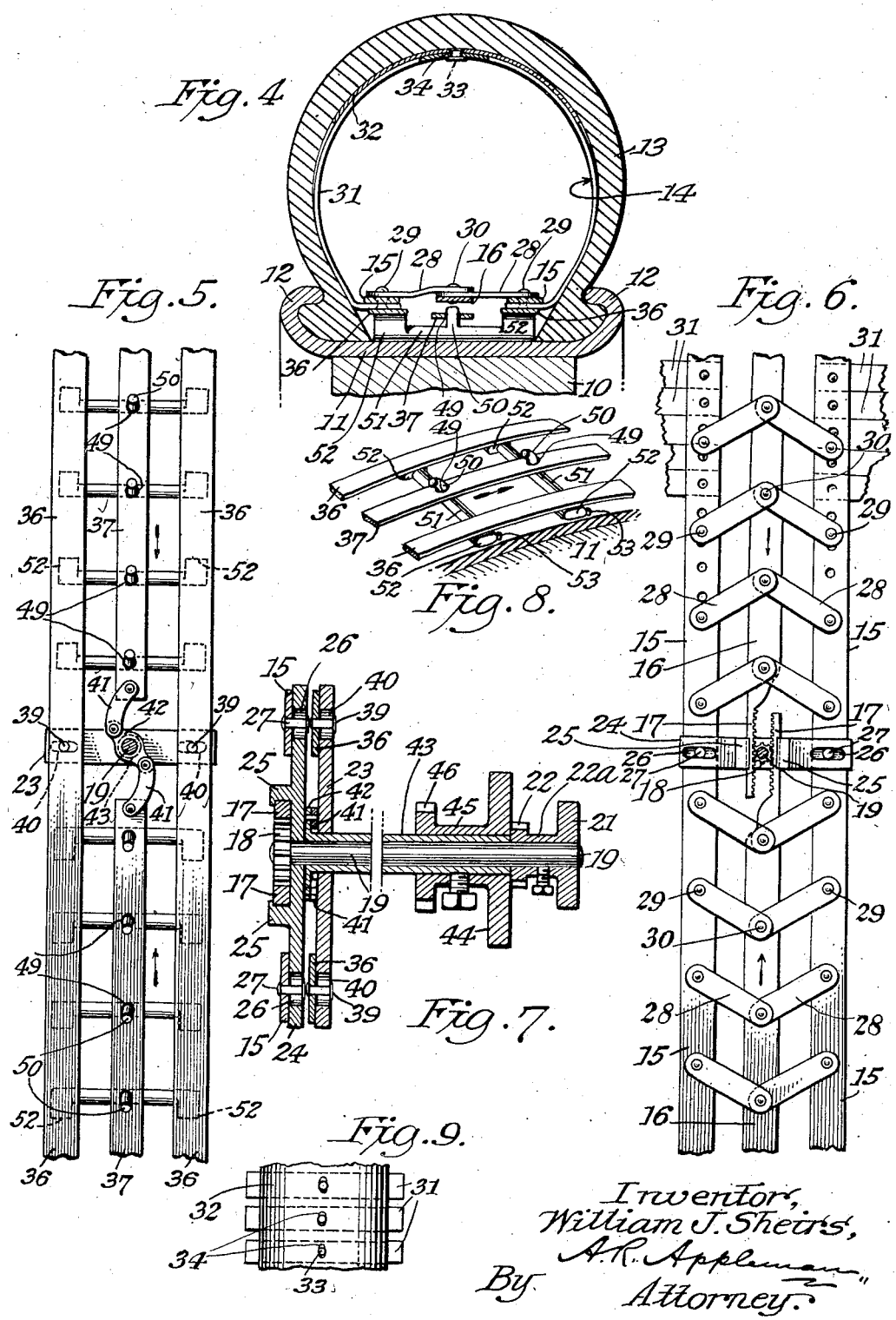
Inventor,
William J. Sheirs,
By A. R. Appleman
Attorney.

Patented Dec. 31, 1929

1,741,441

UNITED STATES PATENT OFFICE

WILLIAM J. SHEIRS, OF BROOKLYN, NEW YORK

CUSHION FRAME FOR TIRES

Application filed October 5, 1928. Serial No. 310,647.

This invention relates to cushion frame devices for automobile tires.

The object of the invention is to provide devices of the above class adapted to be placed within automobile tires in lieu of the inner air tubes in general use, to produce maximum riding comfort, said devices being removable for use again and again as the tires wear out.

The primary feature of my invention resides in the provision of expansible and adjustable resilient frames which may be made in various sizes for use in connection with various sized tires, thus eliminating tire trouble and punctures entirely.

The said frames take the general shape, both circumferentially and cross sectionally, of the usual tire, said frames being preferably constructed of sheet spring strips or straps of appropriate metal, parts of which may be secured together by welding and other parts by rivets or pins as required or desired.

Prominent features are also found in a novel construction whereby the sides of the frames, when they are placed in the tires, may be expanded laterally and uniformly by manipulating a single finger operated device extending through the usual air valve opening in the wheel rim. Other means, normally lying flat on the inner face of the said rim and operated by another finger device, is provided whereby the frames may be expanded radially against the tread portions of said tires to cause said frames to snugly fit or bear against the inner walls of the tires to avoid relative movement or creeping thereof.

In carrying out my invention I may provide a set of three parallel spring rings for each frame, divided to permit overlapping and sliding of the ends, one on the other, and to the outer or side rings I secure a continuous series of semi-circularly bent loops, encircled circumferentially of the frame by a tread ring, slidably connected to each of said loops and having its ends overlapped for adjustment.

The central ring of this set of three rings is connected to the above described outer or side rings by a series of pivoted links arranged in pairs, which act to expand or move laterally the said side rings when the central ring is moved circumferentially of the said frame.

To accomplish the radial expansion movement of a frame when inside the tire, to force it out against the inner face of the tire tread, I may provide another set of three split rings for each frame, which are arranged within the last described set.

A series of spaced rock shafts are arranged to extend across and under these three rings. The ends of these shafts lying under the outer or side rings of this set are formed with short arms or cams, normally lying flat on the wheel rim, the central rings being attached to short arms on said shafts, centrally of their length, so that when the said central ring is drawn or moved circumferentially of the wheel rim, it will rock the said series of shafts, thus turning the cams under the side rings and force the frame to expand outwardly into engagement with the inner face of the tread portion of a tire.

The invention has for its further objects to provide other novel features all of which will be more clearly defined in the following detailed description and then pointed out in the appended claims.

I clearly illustrate my invention in the accompanying drawings in which similar reference characters are employed to designate corresponding parts throughout the several views, in which:

Fig. 4 is a cross sectional elevation of a tire with the cushion frame therein, said frame being expanded laterally and radially against the inner wall of said tire in position for service.

Fig. 5 is a fragmentary plan view of a portion of the inner rings or straps, whereby the cushion frame may be expanded against the tread portion of a tire.

Fig. 6 is a fragmentary plan view of a portion of the outer rings or straps whereby the cushion frame may be expanded laterally against the inner side walls of a tire.

Fig. 7 is an enlarged detail sectional elevation taken about on the line 7—7 of Fig. 1, parts being omitted.

Fig. 8 is a detail perspective of a portion of the inner straps showing their association with rock shafts having cams to expand the cushion frame.

Fig. 9 is a fragmentary plan view showing the connection of the tread ring with the spring loops of the frame.

Figure 1:
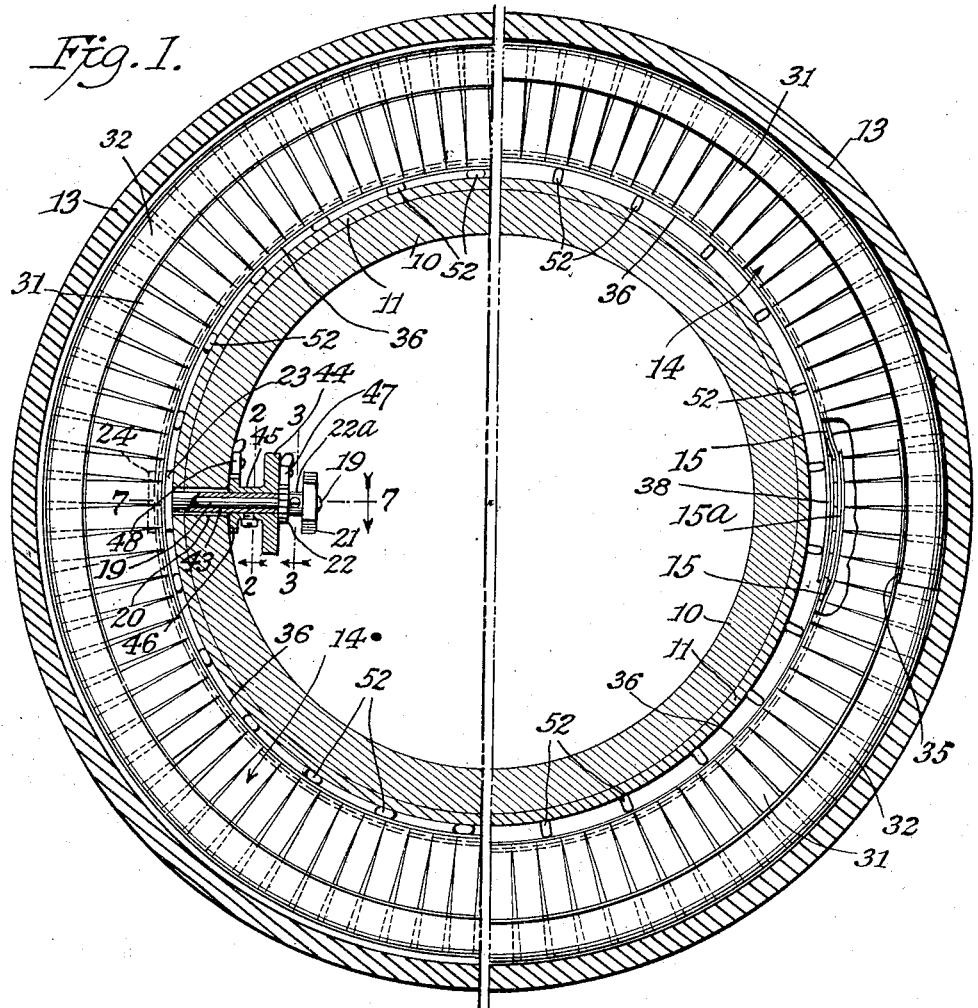
Fig. 1 is a partial sectional side elevation of parts of an automobile wheel showing the improved cushion frame disposed within the tire, the inner tube being removed.
Figure 2:
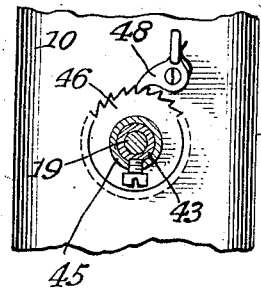
Fig. 2 is a detail cross section on the line 2—2 of Fig. 1.
Figure 3:
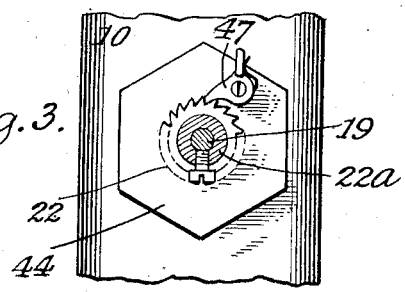
Fig. 3 is a detail cross section on the line 3—3 of Fig. 1.

Referring now to the drawings in detail, 10 designates the felly of an automobile wheel on which the rim 11 is carried, and for a simple disclosure of my invention, I show the rim with integral side bends 12 to hold a clincher tire 13, but, of course, it will be understood that my invention will be equally effective for use in connection with the different popular types of tires and their rims, now in general use.

In carrying out the invention I provide a cushion frame 14, of general semi-circular cross-sectional formation, which is built up on a pair of side rings or straps 15, long enough to permit the free ends thereof to overlap as at 15ª for adjustment.

Associated with these side straps or rings, is a centrally arranged strap or ring 16, also having its free ends overlapping but being divided centrally of its length to carry a pair of toothed bars 17—17 held in mesh with a pinion 18 on a shaft 19, extending outwardly through the usual valve opening 20, in the rim and felly of the wheel. (See Fig 1.)

This shaft carries a handle or head 21 locked to its outer end and is formed integral with a ratchet 22 through a sleeve 22ª.

The shaft 19, extends inwardly through a cross bar 23 (to be hereinafter described) and through another cross bar 24, (see Fig. 7) which is provided with guides 25 for the toothed bars, and slots 26, near the opposite ends, through which pins 27 pass, to secure the side straps 15 thereto in slidable relation, for adjustment.

The side straps 15 of the outer set are connected to the central strap 16 by pivoted links 28, swingable on pins 29 and 30.

Secured to the side straps 15 by riveting, welding or otherwise, are a series of closely arranged semi-circular spring loops 31, which are encircled circumferentially of the frame by a tread ring 32, connected to said loops by pins 33, and slots 34 to permit of expansion and contraction, the tread ring being divided to overlap at its ends as at 35 for adjustment.

Arranged under the straps or rings 15—15 and 16 is another set of straps or rings 36—36 and 37 having overlapping ends 38 for adjustment. The side straps 36, are slidably connected to the cross bar 23, by pins 39 extending through slots 40. The central strap 37, is divided at the cross bar 23, the ends thereof being pivotally connected by links 41, to a cross head 42, formed with a sleeve 43 through which the shaft 19 passes and to which is pinned a finger head 44, formed with a sleeve 45 and a ratchet 46.

The ratchets 22 and 46 are held against rotation in one direction by spring pressed pawls or dogs 47 and 48.

To accomplish the expansion of the cushion frame against the tread portion of a tire I provide the central ring or strap 37, with a series of preferably equally spaced holes 49, through which short curved arms 50, of rockbars 51 project; these rock-bars rest or bear on the rim 11 of the automobile wheel and are formed at their ends with cams or side extensions 52 which underlie the side straps 36, (see best Fig. 8) so that when it is desired to expand the cushion frame radially, the finger piece 44 is turned, which causes the cross head 42, to draw the links and straps 37, toward the cross bar 23, thus rocking the cams 52 as shown at the right in Fig. 1, and also in Fig. 4 of the drawings.

When it is desired to expand or spread the frame 14 laterally, the finger piece 21, may be turned to rotate the shaft 19 and pinion 18, to draw the inner ends of the strap 16, toward the cross bar 24 thus drawing the inner ends of the links 28, toward the said bar and forcing the side straps 15 outwardly.

The above described radial and lateral expansions of the cushion frame structure may be terminated when desired and the pawls 47 and 48 will automatically lock with the ratchets to maintain the parts in fixed position, and when a tire is worn, the pawls may be released to contract the frame, after which the finger pieces 21 and 44 may be removed from the shaft 19 and sleeve 43, permitting them to be drawn outwardly through the valve opening 20, in the felly 10 and rim 11 of the wheel in removing a worn tire and its cushion frame, after which said frame can be placed in a new tire for use again.

I may employ short pins 53 (see Fig. 8) to back up the rock-bars 51, when they start their rocking movements to obviate sliding on the rim 11.

By reference to Fig. 1 of the drawings it will be seen that the left half of that figure shows the cushion frame in the contracted position while the opposite or right side shows the cushion frame in the expanded position. Fig. 4 shows the cushion frame expanded within the tire, ready for service.

What I claim and desire to secure by Letters Patent is:

1. A cushion frame for automobile tires embodying a circular structure including split ring straps, semi-circular spring loops connected to two of said straps, a split tread ring surrounding said loops and slidably connected therewith and means for expanding said frame against the inner walls of a tire.

2. A cushion frame for automobile tires embodying a ring like cage structure including split base strap rings having overlapping ends, a series of semi-circular spring loops attached thereto, a tread ring slidably attached to said loops and means for spreading the base rings laterally and for expanding the said frame radially against the inner wall of a tire.

3. A cushion frame of the class described embodying a ring like cage structure of spring metal straps including split base rings having overlapping ends, loops attached to said rings, a split tread slidably attached to said loops and means for expanding said cage structure laterally and radially against the inner walls of an automobile tire.

4. A device of the class described embodying a circular spring cage structure, including two sets of split rings, a series of spring loops attached to some of said rings, a tread ring attached to said loops and means for expanding said structure laterally and radially against the inner walls of an automobile tire.

5. A device of the class described embodying a circular spring structure including split rings arranged in two sets, pivoted links connecting the members of one set, rock bars arranged under the other set, and means for moving the said rings to expand said structure against the inner walls of an automobile tire.

6. A device of the class described embodying a circular spring structure including two sets of three split rings, cross bars, each having slidable connection with the side members of its respective set, spring loops connected to the side members of one set, a split tread ring secured to said loops and means for moving the side members of both sets to expand the said structure against the inner walls of an automobile tire.

7. A device of the class described embodying a ring-like structure of spring material, including inner and outer sets of three split rings, loops attached to the side members of the outer set, a tread ring attached to said loops, a cross bar having sliding connections with said side members, the central split ring of the outer set being divided at the cross bar and provided with opposite toothed racks, a shaft extending through said cross bar, a pinion on said shaft and meshing with said racks, pivoted links connecting the split ring members of the outer set and means for operating the central members of both sets to expand the said spring structure against the inner walls of an automobile tire.

8. A circular structure of the class described embodying a circular structure of spring metal including expansible rings, spring loops, a tread ring carried by said loops and means arranged exteriorly of the frame for moving said expansible rings to force the said structure into intimate contact with the inner walls of an automobile tire and to maintain it in that position, said means comprising inwardly extending shafts having operative connections with said expansible rings, ratchets, holding pawls, and finger pieces by which said shafts may be operated.

9. An expansible cushion frame of the class described comprising inner and outer sets of split rings, spring loops attached to some of the said rings, a tread ring slidably connected to said loops, the central member of each set being in two parts, and means for drawing the said parts in opposite directions circumferentially, to expand the frame against the inner walls of an automobile tire.

10. An expansible cushion frame of the class described comprising inner and outer sets of split rings, spring loops attached to some of said rings, a tread ring slidably connected to said loops, the central member of each set being in two parts, and means for drawing the said parts in opposite directions circumferentially, to expand the frame against the inner walls of an automobile tire, said means being operated from the exterior of said frame and within the radius of its arc.

Signed at New York, in the county of New York, and State of New York, this 24th day of Sept., A. D. 1928.

WILLIAM J. SHEIRS.